United States Patent Office 3,437,574
Patented Apr. 8, 1969

3,437,574
ANTICORROSIVE TREATMENT OF ZINC AND METALLIC MATERIALS COATED WITH ZINC
Ryuichi Sano, Nishinomiya-shi, and Zenji Ota, Amagasaki-shi, Japan, assignors to Kansai Paint Company, Limited, Amagasaki-shi, Japan
No Drawing. Filed Dec. 6, 1965, Ser. No. 511,979
Claims priority, application Japan, Dec. 7, 1964, 39/68,448
Int. Cl. B01k 5/02; C23c 13/02
U.S. Cl. 204—181                    17 Claims

ABSTRACT OF THE DISCLOSURE

Anticorrosive treatment of zinc and metallic materials coated with zinc which comprises immersing said metal into an alkaline aqueous treating solution consisting of water-soluble or water-dispersible resinate containing ammonium salt of carboxylic acid or organic amine salt, and water-soluble chromate and/or water-soluble bichromate; and supplying direct current to said metal as anode, thus forming resin-chromium-zinc compound such as zinc chromate on the surface of said metal; and subjecting said metal to baking to form a complex anticorrosive film.

---

This invention relates to a new anticorrosive treatment of zinc and metallic materials coated with zinc. Its characteristic is to form a complex anticorrosive film consisting of a resin-chrome-zinc compound and zinc chromate on the surface of the above metals by baking after passing direct current through an aqueous solution composed of water-soluble or water-dispersible resinates and chromates or bichromates or both of these salts using zinc (including zinc alloy) or metallic materials coated with zinc (including zinc alloy) as anode.

The resinates used in this invention are ammonium (or amine) salts of comparatively large amount of carboxyl group-containing alkyd resins, acrylic acid resins, phenolic resins, carboxylic acid adduct drying oils and epoxy ester resins, which are soluble in water, forming resinate ion, or are dispersible in water into the colloidal state.

The alkyd resins are the per se conventional esters of dibasic acid with glycerol or polyglycol. The acid may be phthalic acid ("phthalic acid type alkyd resins"), trimellitic acid ("trimellitic acid type alkyd resins"), pyromellitic acid ("pyromellitic acid type alkyd resins"), etc. Moreover, these alkyd resins can be "modified" in per se conventional manner.

In the present invention, for example, as alkyd resinates, use can be made of ammonium salts or organic amine salts of phthalic acid type alkyd resins, trimellitic acid type alkyl resins, pyromellitic acid type alkyd resins, fatty acid-maleic anhydride adduct modified alkyl resins, fatty acid-fumaric acid adduct modified alkyd resins, dimethylol propionic acid type alkyd resins, rosin-maleic anhydride and other alkyd resins having an acid value greater than 30.

The acrylic acid resins comprise the per se conventional polymers of acrylic, substituted acrylic and methacryic acilds, their salts, esters, and other derivatives, such as nitriles and amides.

As acrylic system resinates, use can be made in the present invention of for example ammonium salts or organic amine salts of carboxyl group-containing acrylic system resins with an acid value above 30, obtained by copolymerization of the following materials: (1) acidic copolymer of one or more of acrylic system monomers such as alkyl acrylate, (e.g. methyl acrylate, etc.), alkyl methacrylate, (e.g. methyl methacrylate, etc.), aryl acrylate, (e.g. phenyl acrylate, etc.), aryl methacrylate, (e.g. phenyl methacrylate, etc.), glycidyl acrylate, glycidyl methacrylate, acrylonitrile and acrylamide with unsaturated carboxylic acids such as acrylic acid, maleic acid and fumaric acid and (2) the above mentioned acrylic system acidic copolymers modified with vinyl system monomers such as styrene, vinyl toluene, vinylidene chloride, vinyl chloride and vinyl acetate.

The "phenol" or "phenolic" resins comprise the products made by reacting a phenol (phenol, cresols, xylenols, p-t-butyl-phenol, p-phenylphenol, bisphenols, resorcinol, etc.) and an aldehyde (formaldehyde, furfural, etc.), as well as the conventionally "modified" phenolics.

As phenol resinates, use can here be made of ammonium salts or organic amine salts of carboxylic acid group-containing phenolic resins of an acid value over 30, such as phenolic resin modified with diphenolic acid and phenolic resin modified with salicylic acid.

As salts of carboxylic acid adduct drying oil, there are employed ammonium salts of organic amine salts of carboxylic cid aadduct drying oil having an acid value over 30, such as, for example, addition compounds of polybasic acid having an $\alpha,\beta$-ethylenic linkage flanked by carbonyl or carboxyl groups, such as maleic anhydride, fumaric acid with vegetable oil, animal oil and synthetic oil.

Salts of epoxy ester are for example ammonium salts or organic amine salts of epoxy ester modified with carboxylic acid adduct drying oil having an acid value over 30 and epoxy ester modified with polybasic acid.

In the above cases, resins can be used which dissolve or emulsify in water due to the presence of hydrophilic radical besides carboxyl group.

Chromates and bichromates to be used in this invention comprise water-soluble chromates and bichromates such as sodium chromate, potassium chromate, ammonium chromate, sodium bichromate, potassium bichromate and ammonium bichromate. The aqueous solution and water dispersed composition to be used in this invention are the aqueous solution and aqueous dispersion, respectively, having a pH over 7 obtained by adding chromate or bichromate to the above-described resinates. In this case, the aqueous solution of bichromate such as sodium bichromate, potassium bichromate and ammonium bichromate is itself acidic (pH below 7); however, in the compositions of pH over 7 used in this invention, bichromate ion is observed to be converted to chromate ion.

Therefore in the aqueous solution of water-dispersed composition used in this invention, the water-soluble bichromates have the same effect as the water-soluble chromates. The aqueous solution and water dispersed composition to be used in this invention require a pH over 7, and a suitable range is from pH 7.2 to pH 8.8.

If the pH becomes acidic, the resinates containing ammonium salt of carboxylic acid or organic amine salt of carboxylic acid as hydrophilic radical generally become unstable in the aqueous composition, and their storage stability is decreased; therefore operation of the method of this invention becomes difficult.

In alkaline solution, when a zinc material is immersed as anode in an electrolyte, and direct current is applied for a short period, a yellow film is easily formed. The yellowish material formed on zinc anode is a resinate-containing mixture (resin acid and zinc resinate, chromate ion and zinc chromate). Zinc chromate thus formed on the surface of zinc materials is confirmed by X-ray diffractometry to be the same as Z.T.O. type zinc chromate (Zinc tetroxychromate, $ZnCrO_4 \cdot 4Zn(OH)_2$ is referred to as Z.T.O. hereinafter). On the contrary, in acidic range solution, zinc chromate does not form and consequently the anticorrosive property of this invention is completely lost.

It is generally recognized that chromate ion and bichromate ion are in equilibrium in an equeous solution, and bichromate ion is predominantly formed in acidic range and chromate ion in alkali range. Zinc bichromate which is considered to be formed when electric current is applied by immersing zinc material to be coated in an equeous treating solution of acidic range, has a very high solubility in water compared with zinc chromate which is formed in alkaline solution; therefore the fact that no stable chromate treated layer is formed in acidic solution can be clearly confirmed by tests.

Z.T.O. type zinc chromate is a very effective material for corrosion prevention, i.e. as rust inhibitive pigment, and it is the important factor in ensuring the splendid corrosion resistance of the film formed by the method of this invention. For the formation of zinc chromate, the existence of metallic zinc material is necessary.

The concentration of chromate ion in the composition should be over 0.1 part in 100 parts of the composition by weight, and suitably should be over 0.5 part against 100 parts of resinate in the composition. Non-volatile matter of the composition is suitably 5–50% (by weight).

Organic solvent may be added to the composition in order to control the dispersed state of each composition, as well as viscosity and dielectric property. Also pigment, dye and other tinting agent may be added to the composition to enhance the appearance effect by coloring the chemical film.

In carrying out the method of this invention the composition of these solutions is desirably kept constant as much as possible during current application; therefore when a composition change becomes detrimental for the operation of this invention, lacking ingredients are added or excessive elements are removed by vaporization or other means to adjust the composition.

For removing excessive ingredients such as alkali, water and organic solvents of the composition of this invention, or for preventing the reaction of chromate on the cathode surface, the use of diaphragms such as porous porcelain plate, ion exchange membrane, asbestos membrane, nylon membrane and the like having selective ion permeability and electro-osmotic property, are effective.

Metallic zinc materials suitable for this invention include all metallic materials coated with film or particles of metallic zinc (including zinc alloy), which conduct electricity through the metallic zinc coating, such as electrically galvanized sheet, hot dip galvanized sheet, and metallic plate coated with zinc metallizing or with zinc-rich paint; also ordinary zinc or zinc alloy. The metallic zinc materials may be in any shape, such as plates, castings, etc.

The electric current application of this invention is carried out by immersing the metallic zinc material to be treated in the above aqueous solution or in the water dispersed composition and using it as anode. Another suitable electrode, for example, iron, aluminum, platinum, or carbon is used as cathode, and the current is passed betwen the electrodes. Since the amount of deposition of the chemical film is in general proportional to the quantity of electricity passed through the electrodes, the necessary film thickness can be controlled by adjusting the quantity of electricity.

The quantity of electricity can be easily adjusted by changing voltage betwen the two electrodes or by changing the electricity-passing time. If the voltage between the electrodes is kept constant, the largest current flow takes place at the beginning of current application, and the current decreases as the electric resistance of the film formed on the anode surface increases.

After a long period of time, the current approaches zero. For a similar reason, voltage between the electrodes must be increased with time in order to keep the current constant. In order to obtain an effective chemical film in the method of this invention, voltage between the electrodes is suitably above 3 v., and the current density of the anode surface should be kept above 5 ma./dm.$^2$.

The first characteristic of the method of this invention is the obtained very superior anticorrosive property, as is hereinafter demonstrated.

Various anticorrosive treatments including the method of this invention are applied to ordinary zinc galvanized steel sheet, and their respective anticorrosive properties are compared in terms of the time required to form white rust on the metal surface by salt-spray test. Japanese Industrial Standard Z 2371 salt-spray test method which corresponds to A.S.T.M. Designation: B 117–61 Method of Salt-spray (Fog) Testing which has a close relation with anticorrosive property of metals.

The results are shown in the following table, and it is evident that the effect of the anticorrosive treatment of this invention is far better than that of the usual chemical treatments.

TABLE.—COMPARISON OF PROPERTIES BETWEEN VARIOUS ANTICORROSIVE TREATMENTS ON ZINC GALVANIZED STEEL SHEET

| No. | Method of treatment | Thickness of treatment film (micron) | Time required for formation of white rust in the salt-spray test (hour) | Remarks |
|---|---|---|---|---|
| 1 | No treatment | 0 | 1 | |
| 2 | Chemical treatment with chromic acid, sulphuric acid, sodium sulphate. | 0.5 | 48 | |
| 3 | do | 4 | 75 | Comparison to conventional chemical treatment. |
| 4 | Zinc phosphate chemical treatment after pickling with hydrochloric acid. | 1 | 24 | |
| 5 | Etching primer | 5 | 60 | |
| 6 | The method of this invention | 2 | 120 | |
| 7 | do | 4 | 200 | |
| 8 | Thermosetting acrylic resin coating. | 25 | 150 | Comparison to conventional paint film. |
| 9 | The method of this invention | 25 | 800 | |
| 10 | Zinc phosphate chemical treatment after pickling with hydrochloric acid. plus Thermosetting acrylic resin coating. | 1<br><br>15 | 150 | Composition for chemical treatment plus paint film. |
| 11 | The method of this invention. plus Thermosetting acrylic resin coating. | 5<br><br>10 | 1,000 | |

The reason that the anticorrosive property of the metallic zinc materials treated by the method of this invention is far superior to those of the usual methods is considered to be as follows: in the method of this invention, Z.T.O. type zinc chromate chemical film is uniformly and densely formed on zinc by electrolysis reaction through direct current application in aqueous alkaline solution, and it forms a kind of resistance film; at the same time molecular or colloidal particles of the resin, which are negatively charged by dissociation of the carboxylic salt, deposit on the anode surface by electrophoresis, electro-osmosis and anodic electrolysis, and partly react with zinc ions which are dissolved from the anode to form water-insoluble zinc resinate, the formation of which is observed by infrared spectroscopic analysis; on the other hand, chromate ion is electrically accumulated inside the film.

If the film consisting of the above compositions is cured by heating, very complex anticorrosive film is formed combining substrate zinc, Z.T.O. type zinc chromate, zinc resinate and resin by chemical and physical bond formation, in addition to the coordinate bond between the polar radical in the resinate and $Cr^{3+}$ formed by the reduction of chromic acid ion.

Thus, a film of a very splendid anticorrosive property is obtained as is shown in the preceding table.

The second characteristic of this invention is a very good adhesion of the chemical film to the metallic zinc material. This is due to the fact that the chemical film of this invention is chemically and physically bonded to zinc.

A chemical film of below 5 microns thus deposited on zinc galvanized steel sheet does not peel or check in various punching or forming operations, or in an ordinary bonding test and scratch hardness test.

The third characteristic of this invention is that the film can be colored freely. By using pigment, dye or other tinting agent in the composition solution of the invention, anticorrosive treatment and coloring of metallic zinc material are simultaneously carried out. Therefore without a finishing coat, sufficient anticorrosive effect and enhanced appearance effect are concurrently obtained.

The fourth characteristic of this invention is that the surface of the film is smooth, and that uniform film can be formed even in the narrow space of the treating metal, due to large electrical resistance of zinc chromate. When zinc chromate is formed on the anode surface at the initial stage of the current application, it forms a dense protective film and increases the resistance between the electrodes; thus, when chromate ions are accumulated in the film formed, and even if the concentration is increased, non-uniformity of current density over the anode surface is essentially excluded, and therefore a smooth surface is easily obtained. The formation of protective film by zinc chromate can also be seen from the phenomenon that the resistance increase between the electrodes is greater for the case that water-soluble chromate attains a certain concentration than for the case wherein the current is passed through the anode of zinc material in an aqueous solution of water-soluble resinate only. If a steel panel is used as anode instead of zinc material, resistance between the electrodes decreases upon addition of a small amount of water-soluble chromate, and marked crawling is observed in the film formed. The reason is that the protective film is not formed on the surface of steel sheet by interfacial electrochemical reaction of chromic acid ion, such as is observed in the case of metallic zinc material. Therefore, as good an anticorrosive effect for general steel materials can not be realized by the method of this invention as for zinc materials.

The fifth characteristic of this invention is that the composition has good storage stability. Generally if a large amount of water-soluble chromate or bichromate is added, the storage stability of the compound tends to become inferior. Also if chromate system protective pigments such as zinc chromate and strontium chromate are added in large enough amount to obtain sufficient anticorrosive property, storage stability is impaired. In the method of this invention, since chromate ion concentration in the film formed on the anode surface by current application is increased to a value higher than the concentration in the aqueous composition, even when storage stability is increased by lowering the chromate ion concentration in the aqueous composition, the obtained anticorrosive property is superior.

The sixth characteristic of the invention is that a good ground coat is obtained by a very short time treatment. If the electric current application of 10 seconds under the interpolar voltage of 20–50 v. is used, a film of 3 to 12 microns is obtained, and if the current is passed 1 second under interpolar voltage of 80 v., a film of 2 microns is obtained after baking, and when conventional coatings are overcoated on the film, its anticorrosive property and adhesive property are markedly increased, and the film shows far better properties than can be achieved by the chemical treatment of the usual zinc phosphate system and chromic acid system.

The seventh characteristic of this invention is that the adhesive property of the coatings is very good. The film formed by this invention has a good adhesion not only to the metallic zinc substrate, since the resinate used in this invention has large polarity, but also to overcoating film such as alkyd type, aminoalkyd type, acrylic type, phenol type, epoxy type, urethane type, oil type and other general coatings.

Presently preferred illustrative embodiments of the invention are set forth, solely by way of example, in the following, wherein percentages are by weight:

EXAMPLE 1

60 parts by weight of butyl alcohol is added to 100 parts by weight of trimellitic acid-alkyd resin (modified with linseed oil fatty acid; acid value 60) whereupon dissolution takes place; 6.5 parts by weight of 28% ammonia water is added to the solution, which is agitated thoroughly for neutralization. 500 parts by weight of water is further added, thereby producing water-soluble varnish. To this 35 parts by weight of 15% ammonium chromate aqueous solution is added to make up a treatment composition, the pH of which is 8.1.

The thus-prepared composition is placed in a treatment tank. After direct current is passed through the said composition for 2 minutes under the interpolar voltage of 30 v. using a zinc galvanized steel panel as anode and a steel panel as cathode, the zinc galvanized steel panel is taken out from the tank, and any water-soluble component, adhering to the surface of the film formed, is washed out by flowing water or by water spray, and then the treated film is cured by baking for 30 minutes at 160° C. The film formed on the zinc galvanized steel panel is of 26 micron thickness. No white rust or the like is observed to be formed at all on the thus-treated panel for over 900 hours as a result of the salt-spray test, the panel thus showing a very good anticorrosive property.

EXAMPLE 2

20 parts by weight of butyl Cellosolve is added to 100 parts by weight of trimellitic acid-alkyl resin (modified with dehydrated castor oil fatty acid; acid value 80), whereupon dissolution take place. To the resultant solution 12.7 parts by weight of dimethylaminoethanol is added, and the whole agitated well for neutralization. 530 parts by weight of water is further added, thereby producing water-soluble varnish. 2 parts by weight of strontium chromate is added to the latter, and dispersion carried out for 24 hours in a ball mill. After dispersion, 15 parts by weight of 25% ammonium chromate aqueous solution is added, a treatment composition being thus obtained. The pH of this treatment composition is 8.5.

The so-prepared composition treatment is placed in a tank. After direct current is passed for 30 seconds through the composition, keeping the interpolar voltage at 50 v., and using zinc galvanized steel panel as anode and an aluminum plate as cathode, the zinc galvanized steel panel is taken out from the tank, and water-soluble component adhering to the surface of the film formed is washed out by water flow or by water spray, and the panel then baked at 180° C. for 15 minutes. A film of 27 micron thickness is formed on the zinc galvanized steel panel. The formation of white rust or the like is not observed at all on the panel for over 1000 hours in the salt-spray test, the panel thus showing a very good anticorrosive property.

EXAMPLE 3

20 parts by weight of butyl alcohol is added to 100 parts by weight of fumaric acid-tung oil adduct (acid value 150), with resultant dissolution. To the thus-obtained solution, 12 parts by weight of dimethylamine is added for neutralization. Then 500 parts by weight of water is added to make up a water-soluble varnish. After adding 10 parts by weight of phthalocyanine blue, the mixture is subjected to dispersion for 24 hours in a ball mill. After dispersion, 6 parts by weight of 20% potassium chromate aqueous solution and 4 parts by weight of 20% potassium bichromate aqueous solution are added to obtain a treating composition, the pH of which is 7.8. This treating composition is put into a treating tank.

After direct current is passed through the treating composition for 5 minutes, keeping the interpolar voltage at 20 v. and using a zinc metallizing steel plate as anode and a steel panel as cathode, the zinc metallizing steel panel is taken out, and water soluble component on the surface of the film formed is washed out by water flow or by water spray, after which the panel is baked at 200° C. for 10 minutes. A tinted film of 30 micron film thickness is thus formed on the zinc metallizing steel panel. No white rust or the like is observed on this panel for over 1000 hours in the salt-spray test, the panel thus showing a very good anticorrosive property.

EXAMPLE 4

40 parts by weight of ethyl Cellosolve is added to 100 parts by weight of maleic acid-linseed oil adduct (acid value 100), with resultant dissolution. 10.8 parts by weight of 28% ammonia water is added further for neutralization. By adding 517 parts by weight of water, a water-soluble maleic acid-linseed oil adduct varnish of 15% non-volatile matter is made up. Next 6 parts by weight of ethyl Cellosolve is added to 15 parts by weight of phenol resin modified with salicylic acid (acid value 80) with resultant dissolution; further 1.3 parts by weight of 28% ammonia water is added for neutralization. Then 78 parts by weight of water is added to make up a water-soluble phenol resin varnish of 15% non-volatile matter. The water-soluble maleic acid-linseed oil adduct varnish is mixed with the water-soluble phenol resin varnish, and further 33 parts by weight of 15% ammonium chromate aqueous solution is added to make up a treatment composition, the pH of which is 8.3. This composition is put into a treatment tank.

Direct current is passed through the composition for 10 seconds, at 30 v., using a zinc galvanized steel panel as anode and a steel panel as cathode. Then excessive composition adhering to the surface of the film formed is squeezed out by a gum roller, and the coated zinc galvanized steel panel is baked at 300° C. for 1 minute. A film of 4 micron thickness is formed on the zinc galvanized steel panel, and no white rust or the like is observed to be formed thereon for over 200 hours in the salt-spray test. It shows a very superior anticorrosive property relative to ordinary zinc galvanized steel panel chemically treated. Aminoalkyd resin coating of 20 microns thickness is coated on the processed zinc galvanized steel panel by his treatment; this panel shows no white rust or the like at all after over 900 hours of the salt-spray test, thus exhibiting a very good anticorrosive property.

EXAMPLE 5

To 200 parts by weight of a water-soluble acrylic resin (a copolymerized resin of 3 moles of ethyl acrylate, 3 moles of butyl acrylate and 4 moles of ammonium acrylate; having 50% of non-volatile matter; solvent being a mixture of water and ethanol in the weight ratio of 1 to 1), 25 parts by weight of 20% sodium chromate aqueous solution and 480 parts by weight of water are added to make up a treating compound of pH 7.5.

Electric current is applied to a zinc galvanized steel panel according to the method described in the preceding Example 4, and the resultant coated panel is subjected to forced drying. A film of 5 micron thickness is thus formed on the zinc galvanized steel panel, and no white rust and the like is observed for over 220 hours in the salt-spray test. It shows a very superior anticorrosive property compared to ordinary chemical treated zinc galvanized steel panel. When a thermosetting acrylic resin coating of 10 micron thickness is coated on the zinc galvanized steel panel treated by this method, and is tested by the salt-spray test, no white rust and the like is observed for over 1000 hours, thus showing a very good anticorrosive property.

EXAMPLE 6

To 200 parts by weight of a water-soluble acrylic resin (a copolymerization product of ethyl acrylate 3 moles, butyl acrylate 3 moles and ammonium acrylate 3 moles; having 50% of non-volatile matter; the solvent being a mixture of water and ethanol in the weight ratio of 1 to 1), 5 parts by weight of carbon black and 755 parts by weight of water are added, and the carbon black is then dispersed uniformly in a sand mill. Then 85 parts by weight of acrylic emulsion (commercially available as Rhoplex AC 200 having 46% of non-volatile matter) and 35 parts by weight of 20% ammonium chromate solution are added to make up a treating composition of pH 7.8.

This is charged into one side of a treating tank which has a biscuit fired diaphragm, and to the other side 0.5% ammonia water is charged. Direct current is passed for 20 seconds under 200 v. using a zinc galvanized steel panel placed in the composition side as anode, and a steel panel placed in the ammonia water side as cathode. After water-soluble component adhering to the surface of the film formed is washed out by water flow or by water spray, forced drying is carried out at 350° C. for 30 seconds. A tinted film of 6 microns is formed on the zinc galvanized steel panel, which shows no white rust or the like for over 250 hours in the salt-spray test.

The decrease of gloss after 1000 hours of weather-ometer irradiation is below 20%, and the surface condition is kept good. Scratch hardness test, impact test, Erichsen test and other physical tests show almost the same values as those before the irradiation, and are very good.

What is claimed is:

1. A method of rendering a zinc-containing substrate resistant to corrosion, which comprises forming an anticorrosive film on the surface of the said substrate by (a) immersing the substrate as anode in an aqueous electrolyte at a pH above 7, said electrolyte containing (1) ammonium or organic amine resinate containing —COO— group as hydrophilic radical and (2) a member selected from the group consisting of water-soluble chromate, water-soluble bichromate and mixtures thereof, (b) passing direct current through said electrolyte from cathode to anode whereby the objective anticorrosive film is deposited on the latter, (c) discontinuing the current passage when the desired thickness of film has been thus deposited, and (d) withdrawing the coated anode from the electrolyte and subjecting the withdrawn coated anode to thermal curing.

2. A method according to claim 1, wherein the substrate is zinc metal.

3. A method according to claim 1, wherein the substrate is zinc alloy.

4. A method according to claim 1, wherein the substrate is zinc galvanized sheet steel.

5. A method according to claim 1, wherein the said pH is in the range from 7.2 to 8.8.

6. A method according to claim 1, wherein the deposited film comprises zinc chromate.

7. A method according to claim 1, wherein the deposited film comprises water-soluble ammonium or organic amine resinate.

8. A method according to claim 1, wherein the deposited film comprises zinc chromate and water-soluble ammonium or organic amine resinate.

9. A method according to claim 1, wherein the electrolyte contains more than 0.1 part by weight of chromate ion per 100 parts by weight of electrolyte.

10. A method according to claim 1, wherein the electrolyte contains more than 0.5 part by weight of chromate ion per 100 parts by weight of resinate.

11. A method according to claim 1, wherein the voltage is above 3 volts and the current density at the anode is greater than 5 ma./dm.$^2$.

12. A method according to claim 1, wherein the resin is trimellitic acid type alkyd resin.

13. A method according to claim 1, wherein the resin is fumaric acid-tung oil adduct.

14. A method according to claim 1, wherein the resin is maleic acid-linseed oil adduct.

15. A method according to claim 1, wherein the resin is copolymer of ethyl acrylate, butyl acrylate and ammonium acrylate.

16. A method according to claim 1, wherein the deposited film is overcoated with a resin film.

17. A method according to claim 16, wherein the resin is acrylic resin.

References Cited

UNITED STATES PATENTS

| | | | |
|---|---|---|---|
| 2,412,543 | 12/1946 | Tanner | 204—38.42 |
| 2,469,015 | 5/1949 | Stareck et al. | 204—56 |
| 2,851,386 | 9/1958 | Hartman | 148—6.2 |
| 3,011,958 | 12/1961 | White | 204—56 |
| 3,036,934 | 5/1962 | Horton et al. | 148—6.2 |
| 3,053,692 | 9/1962 | Pocock | 148—6.2 |
| 3,132,055 | 5/1964 | Tanaka et al. | 148—6.16 |
| 3,175,964 | 3/1965 | Watanabe et al. | 204—181 |
| 3,330,744 | 7/1967 | Wright et al. | 204—56 |
| 3,378,477 | 4/1968 | Gentles et al. | 204—181 |

HOWARD S. WILLIAMS, *Primary Examiner.*

E. ZAGARELLA, JR., *Assistant Examiner.*

U.S. Cl. X.R.

148—6.2; 204—37, 38